(12) United States Patent
Singh et al.

(10) Patent No.: US 11,429,890 B2
(45) Date of Patent: Aug. 30, 2022

(54) DYNAMIC PATTERN RECOGNITION AND DATA RECONCILIATION

(71) Applicant: Bank of America Corporation, Charlotte, NC (US)

(72) Inventors: Awadhesh Pratap Singh, Telangana (IN); Ravi Kanth Bommakanti, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 1093 days.

(21) Appl. No.: 15/797,151

(22) Filed: Oct. 30, 2017

(65) Prior Publication Data

US 2019/0130306 A1     May 2, 2019

(51) Int. Cl.
*G06N 20/00*     (2019.01)
*G06F 7/02*      (2006.01)
*G06N 5/04*      (2006.01)

(52) U.S. Cl.
CPC .............. *G06N 20/00* (2019.01); *G06F 7/023* (2013.01); *G06N 5/047* (2013.01)

(58) Field of Classification Search
CPC ......... G06N 20/00; G06N 5/047; G06F 7/023
See application file for complete search history.

(56) References Cited

U.S. PATENT DOCUMENTS

| 5,093,787 | A | 3/1992 | Simmons |
| 5,666,553 | A | 9/1997 | Crozier |
| 5,701,400 | A * | 12/1997 | Amado ..................... G06N 5/02 706/45 |
| 5,933,531 | A * | 8/1999 | Lorie .................. G06V 10/987 382/229 |
| 6,061,652 | A * | 5/2000 | Tsuboka ................ G10L 15/142 704/245 |
| 7,480,640 | B1 | 1/2009 | Elad et al. |
| 7,565,335 | B2 | 7/2009 | Tang et al. |
| 7,640,199 | B1 | 12/2009 | Hyland |
| 7,783,583 | B2 | 8/2010 | Sendhoff et al. |
| 9,336,302 | B1 * | 5/2016 | Swamy ................. G06F 16/355 |

(Continued)

OTHER PUBLICATIONS

U.S. Appl. No. 62/529,191 (Year: 2017).*

*Primary Examiner* — George Giroux
(74) *Attorney, Agent, or Firm* — Banner & Witcoff, Ltd.

(57) ABSTRACT

Systems for dynamically performing pattern recognition and data reconciliation functions are provided. In some examples, a system may receive data, from one or more computing systems. In some examples, one or more machine learning datasets may be used to identify datasets, data elements, or the like, for comparison. The identified datasets, data elements, and the like, may be compared to pre-stored patterns to determine whether the pattern matches a pre-stored pattern. If not, the pattern may be flagged as a new pattern and instructions for further processing may be requested. In some arrangements, the identified datasets, data elements, or the like, may be compared to determine whether a pattern and/or value of the datasets, data elements, or the like, matches. If not, one or more machine learning datasets may be used to generate a corrective action to align the data. In some examples, the generated corrective action may be automatically executed to align the data.

15 Claims, 13 Drawing Sheets

(56) References Cited

U.S. PATENT DOCUMENTS

| | | | |
|---|---|---|---|
| 9,536,191 B1 | 1/2017 | Arel et al. | |
| 9,679,258 B2 | 6/2017 | Mnih et al. | |
| 2003/0149603 A1 | 8/2003 | Ferguson et al. | |
| 2005/0187852 A1 | 8/2005 | Hwang | |
| 2009/0083649 A1* | 3/2009 | Baier | G05B 17/02 |
| | | | 715/771 |
| 2009/0216666 A1 | 8/2009 | Antao et al. | |
| 2013/0080641 A1* | 3/2013 | Lui | H04L 41/0886 |
| | | | 709/226 |
| 2015/0012501 A1* | 1/2015 | Xing | G06F 16/951 |
| | | | 707/690 |
| 2017/0024446 A1 | 1/2017 | O'Kane et al. | |
| 2017/0177584 A1* | 6/2017 | Narasimha | H04N 21/235 |
| 2019/0012733 A1* | 1/2019 | Gorman | G06N 20/00 |

* cited by examiner

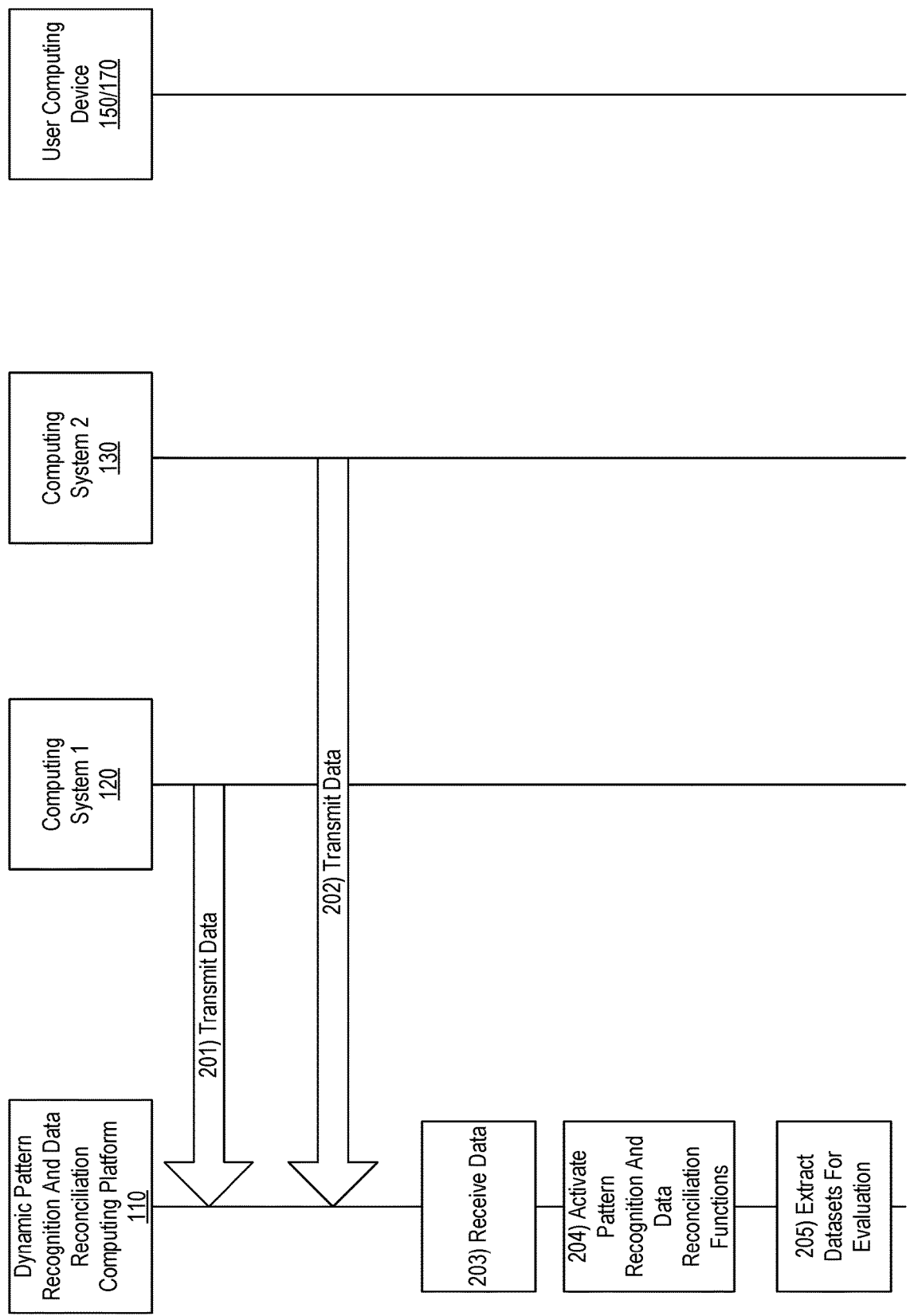

DYNAMIC PATTERN RECOGNITION AND DATA RECONCILIATION

BACKGROUND

Aspects of the disclosure relate to electrical computers, systems, and machine learning. In particular, one or more aspects of the disclosure relate to performing dynamic pattern recognition and data reconciliation functions.

Data processing and reconciliation is an important aspect of conducting business for many entities. In large enterprises, tens or hundreds of thousands of data sets may flow through various applications executed by the enterprise. However, these data sets often are not standardized and, in many cases, different data sets require different controls. Managing these aspects when dealing with vast amounts of data is time consuming, inefficient, and requires a substantial commitment of computing resources. Accordingly, arrangements that may rely on machine learning to perform standardization and reconciliation functions may be advantageous in reducing the computing resources needed.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with recognizing patterns in vast amounts of data, evaluating data to determine whether appropriate values and patterns match and, if not, generated and/or executing a corrective action to properly align the data.

In some examples, a system, computing platform, or the like, may receive data, from one or more computing systems. The data may be data received from various applications executing within an entity system. In some examples, one or more machine learning datasets may be used to identify datasets, data elements, or the like, for comparison.

In some examples, identified datasets, data elements, and the like, may be compared to pre-stored patterns to determine whether the pattern matches a pre-stored pattern. If not, the pattern may be flagged as a new pattern and instructions for further processing may be requested.

In some arrangements, the identified datasets, data elements, or the like, may be compared to determine whether a pattern and/or value of the datasets, data elements, or the like, matches. If not, one or more machine learning datasets may be used to generate a corrective action to align the data. In some examples, the generated corrective action may be automatically executed to align the data (e.g., an instruction or command to modify the data may be transmitted to a computing system and executed, thereby modifying the data element).

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2C depict an illustrative event sequence for implementing dynamic pattern recognition and data reconciliation functions in accordance with one or more aspects described herein;

DETAILED DESCRIPTION

Figure 1A:
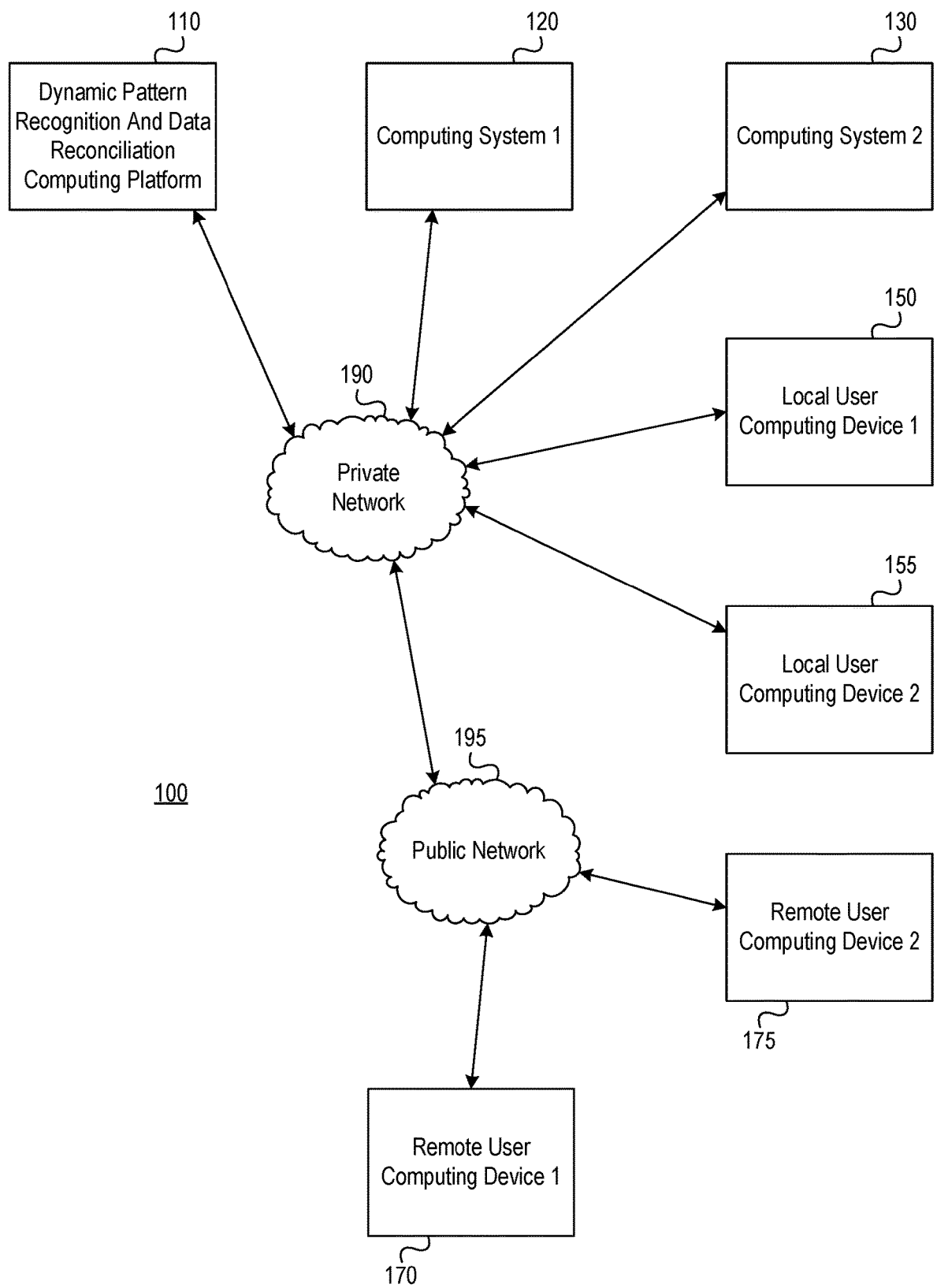
FIGS. 1A and 1B depict an illustrative computing environment for implementing dynamic pattern recognition and data reconciliation functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to using machine learning to identify one or more datasets, data elements, or the like for comparison, determine whether a match exists between two datasets, data elements, or the like, and generate a proposed corrective action.

Many entities process thousands and tens of thousands of datasets. Providing data controls for the vast amount of data can be inefficient and can greatly consume computing resources. Accordingly, a system for standardizing data controls, using machine learning to analyze data and automatically correct errors, and the like, may be advantageous in reducing resources required for processing data, improving efficiency and reducing time to process data, and the like.

Accordingly, aspects described herein provide for dynamic pattern recognition and data reconciliation functions. In some examples, one or more machine learning datasets may be used to identify data elements for comparison. For instance, one or more machine learning datasets may be used to identify a source data element and a target data element for comparison. In some examples, the system may attempt to recognize a pattern of one or more of the data elements. If the pattern matches a pre-stored pattern, the system may further analyze the data. If not, the system may identify the pattern as a new pattern and may request further instructions.

In some arrangements, the data elements may be compared to each other to determine whether the pattern and/or value of the data elements matches. If so, additional data elements may be identified for comparison. If not, one or more machine learning datasets may be used to generate a proposed corrective action. In some examples, the proposed corrective action may be automatically implemented (e.g., based on various criteria). In other examples, a user interface may be generated requesting user input to execute the proposed corrective action.

In some arrangements, a relationship between the first data element and the second data element may be identified. If a relationship is identified, the system may request additional instructions regarding the identified relationship.

In some examples, a dynamic dashboard may be generated. For instance, the system may generate a dynamic dashboard that may include fields, columns, or the like, identified and displayed based on features of the data being displayed (e.g., attributes of the data, type of pattern, strength of match, and the like).

These and various other arrangements will be discussed more fully below.

Figure 1B:
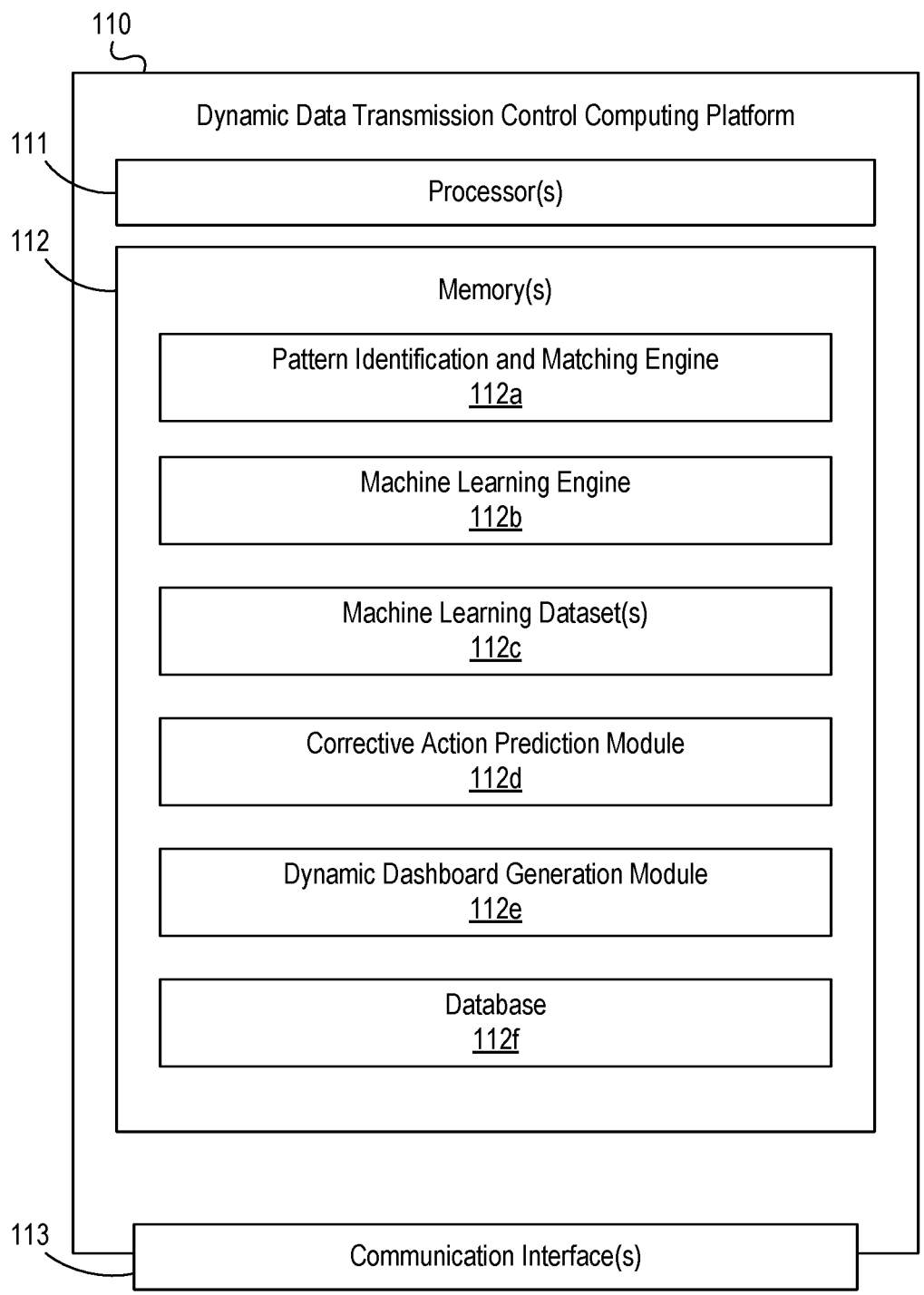

FIGS. 1A and 1B depict an illustrative computing environment for implementing and using a dynamic pattern recognition and data reconciliation computing system in accordance with one or more aspects described herein. Referring to FIG. 1A, computing environment 100 may include one or more computing devices and/or other computing systems. For example, computing environment 100 may include a dynamic pattern recognition and data reconciliation computing platform 110, a first computing system 120, a second computing system 130, a first local user computing device 150, a second local user computing device 155, a first remote user computing device 170, and a second remote user computing device 175.

Dynamic pattern recognition and data reconciliation computing platform 110 may be configured to host and/or execute a machine learning engine to provide dynamic pattern recognition and data reconciliation functions. In some examples, datasets may be received from one or more computing systems or devices, such as first computing system 120, second computing system 130, and the like. In some examples, machine learning may be used to identify one or more datasets for further analysis. In some examples, the one or more datasets may be analyzed to determine whether a pattern associated with one or more datasets, data elements, or the like, matches a pre-stored pattern. If not, a request may be generated to store and/or label a new pattern.

Further, in some arrangements, the identified one or more datasets may be compared to each other to determine whether the patterns, values, or the like, of the dataset, data element, or the like, match. If so, additional datasets, data elements, and the like, may be identified for comparison. If not, one or more corrective actions may be generated. In some examples, the predicted corrective action may be displayed to a user with a request for user input to execute the corrective action. In other examples, the generated/predicted corrective action may be automatically executed. One or more machine learning datasets may then be validated and/or updated based on the execution.

Computing system 1 120 and/or computing system 2 130 may be any type of computer system performing various functions, for example, within an entity. For instance, computing system 1 120 and/or computing system 2 130 may be one or more data storage and processing systems, one or more event processing systems, one or more data transfer systems, and the like. In some examples, data may be received from one or more of computing system 1 120 and/or computing system 2 130 including data that may be analyzed and/or processed by the dynamic pattern recognition and data reconciliation computing platform 110. Computing system 1 120 and/or computing system 2 130 may also be configured to execute one or more corrective actions generated or predicted by dynamic pattern recognition and data reconciliation computing platform 110 to modify one or more aspect of computing system 1 120 and/or computing system 2 130 based on one or more machine learning datasets.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. The local and remote user computing devices may be used to communicate with, for example, dynamic pattern recognition and data reconciliation computing platform 110, receive and display notifications, modify one or more settings associated with dynamic pattern recognition and data reconciliation computing platform 110, and the like.

In one or more arrangements, computing system 1 120, computing system 2 130, local user computing device 150, local user computing device 155, remote user computing device 170, and/or remote user computing device 175 may be any type of computing device or combination of devices capable of performing the particular functions described herein. For example, computing system 1 120, computing system 2 130, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of computing system 1 120, computing system 2 130, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include dynamic pattern recognition and data reconciliation computing platform 110. As illustrated in greater detail below, dynamic pattern recognition and data reconciliation computing platform 110 may include one or more computing devices configured to perform one or more of the functions described herein. For example, dynamic pattern recognition and data reconciliation computing platform 110 may include one or more computers (e.g., laptop computers, desktop computers, servers, server blades, or the like).

As mentioned above, computing environment 100 also may include one or more networks, which may interconnect one or more of dynamic pattern recognition and data reconciliation computing platform 110, computing system 1 120, computing system 2 130, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic pattern recognition and data reconciliation computing platform 110, computing system 1 120, computing system 2 130, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect dynamic pattern recognition and data reconciliation computing platform 110, computing system 1 120, computing system 2 130, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., dynamic pattern recognition and data reconciliation computing platform 110, computing system 1 120, computing system 2 130, local user computing device 150, local user computing device 155) with one or more networks and/or computing devices that are not associated with the organization. For example remote user computing device 170, and/or remote user computing device 175 might not be associated with an organization that operates private network 190 (e.g., because remote user computing device 170 and remote user computing device 175 may be owned, operated, and/or serviced by one or more entities different from the organization that operates private network 190, such as one or more customers of the organization, public or government entities, and/or vendors of the organization, rather than being owned and/or operated by the organization itself), and public network 195 may include one or more networks (e.g., the internet) that connect remote user computing device 170 and remote user computing device 175 to private network 190 and/or one or more computing devices connected thereto (e.g., dynamic pattern recognition and data reconciliation computing platform 110, computing system 1 120, computing system 2 130, local user computing device 150, local user computing device 155).

Referring to FIG. 1B, dynamic pattern recognition and data reconciliation computing platform 110 may include one or more processors 111, memory 112, and communication interface 113. A data bus may interconnect processor(s) 111, memory 112, and communication interface 113. Communication interface 113 may be a network interface configured to support communication between dynamic pattern recognition and data reconciliation computing platform 110 and one or more networks (e.g., private network 190, public network 195, or the like). Memory 112 may include one or more program modules or engines including hardware and/or software and having instructions that when executed by processor(s) 111 cause dynamic pattern recognition and data reconciliation computing platform 110 to perform one or more functions described herein and/or one or more databases that may store and/or otherwise maintain information which may be used by such program modules, engines, and/or processor(s) 111. In some instances, the one or more program modules, engines, and/or databases may be stored by and/or maintained in different memory units of dynamic pattern recognition and data reconciliation computing platform 110 and/or by different computing devices that may form and/or otherwise make up dynamic pattern recognition and data reconciliation computing platform 110.

For example, memory 112 may have, store, and/or include a pattern identification and matching engine 112a. Pattern identification and matching engine 112a may store instructions and/or data that may cause or enable the dynamic pattern recognition and data reconciliation computing platform 110 to receive data, including datasets, data elements, and the like, from one or more computing devices, systems, or the like, such as computing system 1 120, computing system 2 130, and the like. The data may be received by the pattern identification and matching engine and may be compared to one or more pre-stored patterns (e.g., that may be stored in database 112f, or other database) to determine whether a pattern associated with a dataset, data element, or the like, matches a pre-stored pattern. If not, the pattern identification and matching engine 112a may flag the pattern as a new pattern (e.g., not matching any currently pre-stored pattern) and may generate a user interface requesting user input regarding storing the new pattern, naming or labeling the new pattern, and the like.

For instance, pattern identification and matching engine 112a may generate a user interface including an indication that a new pattern has been identified and requesting user input on whether to store the pattern, providing a label for the pattern, and the like. The user interface may be transmitted to one or more computing devices, such as local user computing device 150, 155, remote user computing device 170, 175, or the like, and may be displayed on the display of the computing device. User input may be provided (e.g., via the computing device) and may be transmitted to the pattern identification and matching engine 112a. Based on the user input, the pattern identification and matching engine 112a may execute instructions or commands to store/not store the identified new pattern, label the new pattern with an identified provided by the user, and the like.

If one or more datasets, data elements, and the like, evaluated by the pattern identification and matching engine 112a matches a pre-stored pattern, machine learning may be used to identify other elements for comparison, determine whether a pattern is correct, generate corrective action, and the like.

The dynamic pattern recognition and data reconciliation computing platform 110 may further have, store, and/or include a machine learning engine 112b and machine learning datasets 112c. Machine learning engine 112b and machine learning datasets 112c may store instructions and/or data that cause or enable dynamic pattern recognition and data reconciliation computing platform 110 to evaluate datasets, data elements, or the like, received, identified one or more datasets, data elements, or the like for comparison, determine whether the datasets, data elements, and the like being compared have matching patterns and or values, generate one or more corrective actions, and the like. The machine learning datasets 112c may be generated based on analyzed data (e.g., data from previously received datasets, and the like), raw data, and/or received from one or more outside sources.

The machine learning engine 112b may receive data (e.g., data from computing system 1 120, computing system 2 130, and the like) and, using one or more machine learning algorithms, may generate one or more machine learning datasets 112c. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms (e.g., probabilistic clustering, exclusive clustering, and the like), artificial neural network algorithms, and the like. Additional or alternative machine learning algorithms may be used without departing from the invention. In some examples, the machine learning engine 112b may analyze data to identify patterns of activity, sequences of activity, and the like, to generate one or more machine learning datasets 112c.

The machine learning datasets 112c may include machine learning data linking one or more patterns, values, data attributes, or the like, to one or more corrective actions. For instance, data from previously analyzed data transfers may be used to generate machine learning datasets 112c (e.g., as machine learning training data) linking an expected pattern or value to one or more other patterns or values and/or to one or more corrective actions to modify the one or more other patterns or values to the expected pattern or value, or other corrective action. For instance, the machine learning datasets 112c may identify an expected pattern (e.g., xx-xx-xx), a current pattern (e.g., xx-x-xxx) and may link the expected pattern and current pattern to a corrective action to modify the current pattern to shift the second hyphen one digit to the right to transform xx-x-xxx to xx-xx-xx. Various other example modifications or corrective actions may be used without departing from the invention.

The machine learning datasets 112c may be updated and/or validated based on the data associated with one or more datasets, data elements, or the like, received subsequent to, for instance, initial data received and analyzed (e.g., from computing system 1 120, computing system 2 130, or the like). For instance, as additional or subsequent data is received, the machine learning datasets 112c may be validated and/or updated based on the newly received information. Accordingly, the system may continuously refine determinations, pattern recognition, corrective actions, and the like, e.g., via reinforced learning, as will be discussed more fully herein.

The machine learning datasets 112c may be used by, for example, a corrective action prediction module 112d. Corrective action prediction module 112d may store instructions and/or data that may cause or enable the dynamic pattern recognition and data reconciliation computing platform 110 to identify, based on the one or more machine learning datasets 112c, a corrective action in occurrences of patterns and/or values that do not match, generate a signal, instruction, or command to execute the corrective action (e.g., either automatically or based on user input, as will be discussed more fully here), generate a user interface displaying the corrective action and requesting user input, transmitting an instruction to execute the corrective action to one or more computing devices or systems, such as computing system 1 120, computing system 2 130, and the like. In some examples, a corrective action may include modifying a pattern or value of the dataset, data element, or the like. Additionally or alternatively, the corrective action may be determined based on other data elements within a dataset (e.g., if a data element is in the wrong column, the data element may be swapped with the data element in the correct column, or the like). In still other examples, the corrective action may include operations such as column transposing, string manipulation, unit conversions, mathematical operations (e.g., rounding, truncating, and the like) and the like. Various other corrective actions may be proposed and/or executed without departing from the invention.

In continuing the example above, the corrective action prediction module 112d may identify the appropriate corrective action to modify the data xx-x-xxx based on one or more machine learning datasets, may generate a signal, instruction, or command to execute the corrective action by modifying the dataset, data element, or the like, and may transmit the signal, instruction or command to computing system 1 120, computing system 2 130, or the like, to execute the corrective action and modify or transform the data.

Dynamic pattern recognition and data reconciliation computing platform 110 may further have, store and/or include a dynamic dashboard generation module 112e. Dynamic dashboard generation module 112e may have or include instructions and/or data that may cause or enable the dynamic pattern recognition and data reconciliation computing platform 110 to generate one or more dynamic user interfaces for display on one or more computing devices, such as local user computing device 150, 155, remote user computing device 170, 175, or the like. In some examples, the dynamic dashboard generation module 112e may generate a dashboard including a dataset, data element, or the like, identified for comparison. The dashboard may further include categories of matching dynamically selected based on the strength of the match of the pattern or value if a match occurred, a difference in patterns or values if a match did not occur, a type of corrective action predicted, whether it was executed, and the like.

Dynamic pattern recognition and data reconciliation computing platform 110 may further include one or more databases 112f. As discussed above, the database 112f may store one or more pre-stored patterns, a newly added pattern that is being stored, and the like.

Figure 2B:
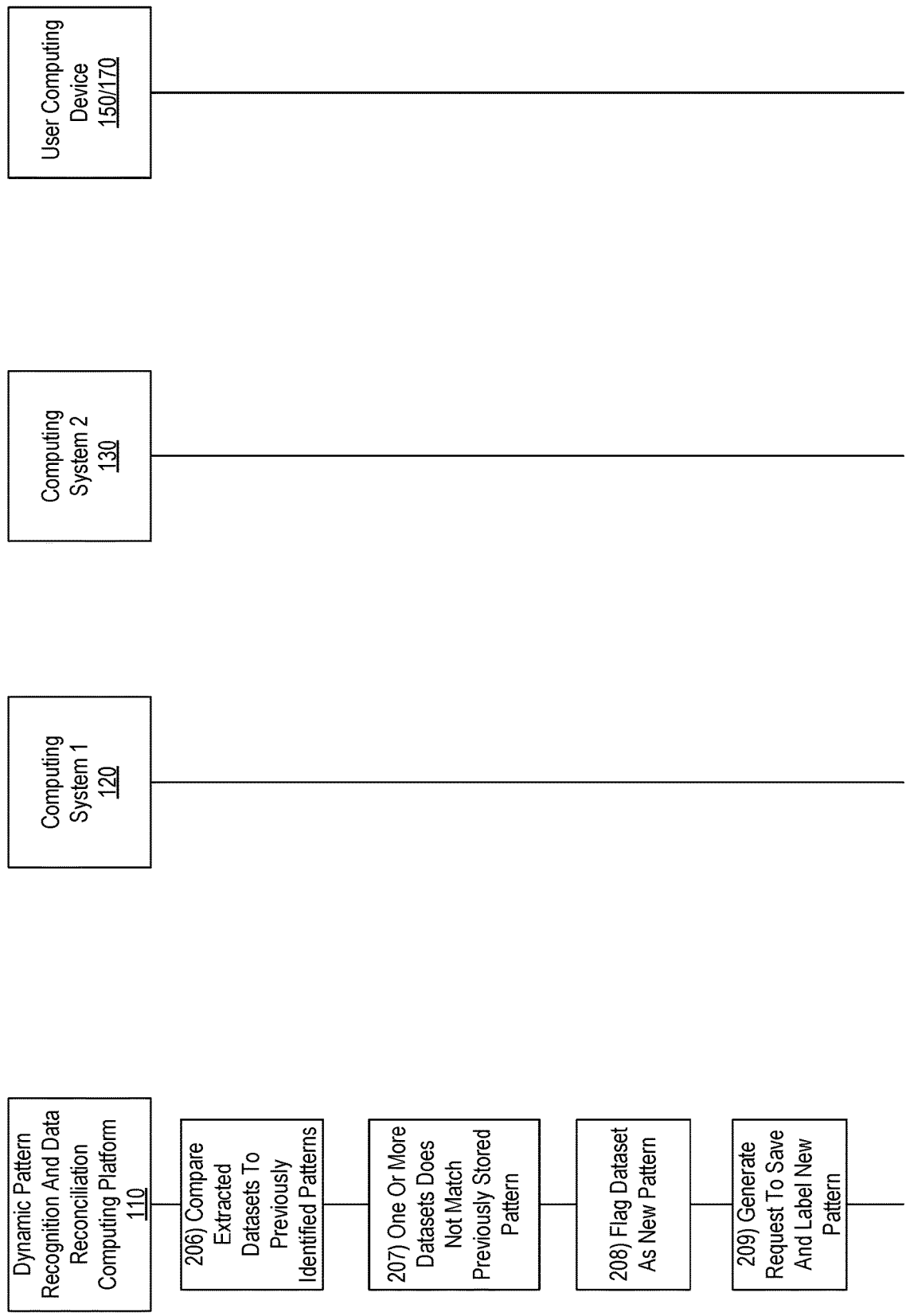
Figure 2C:
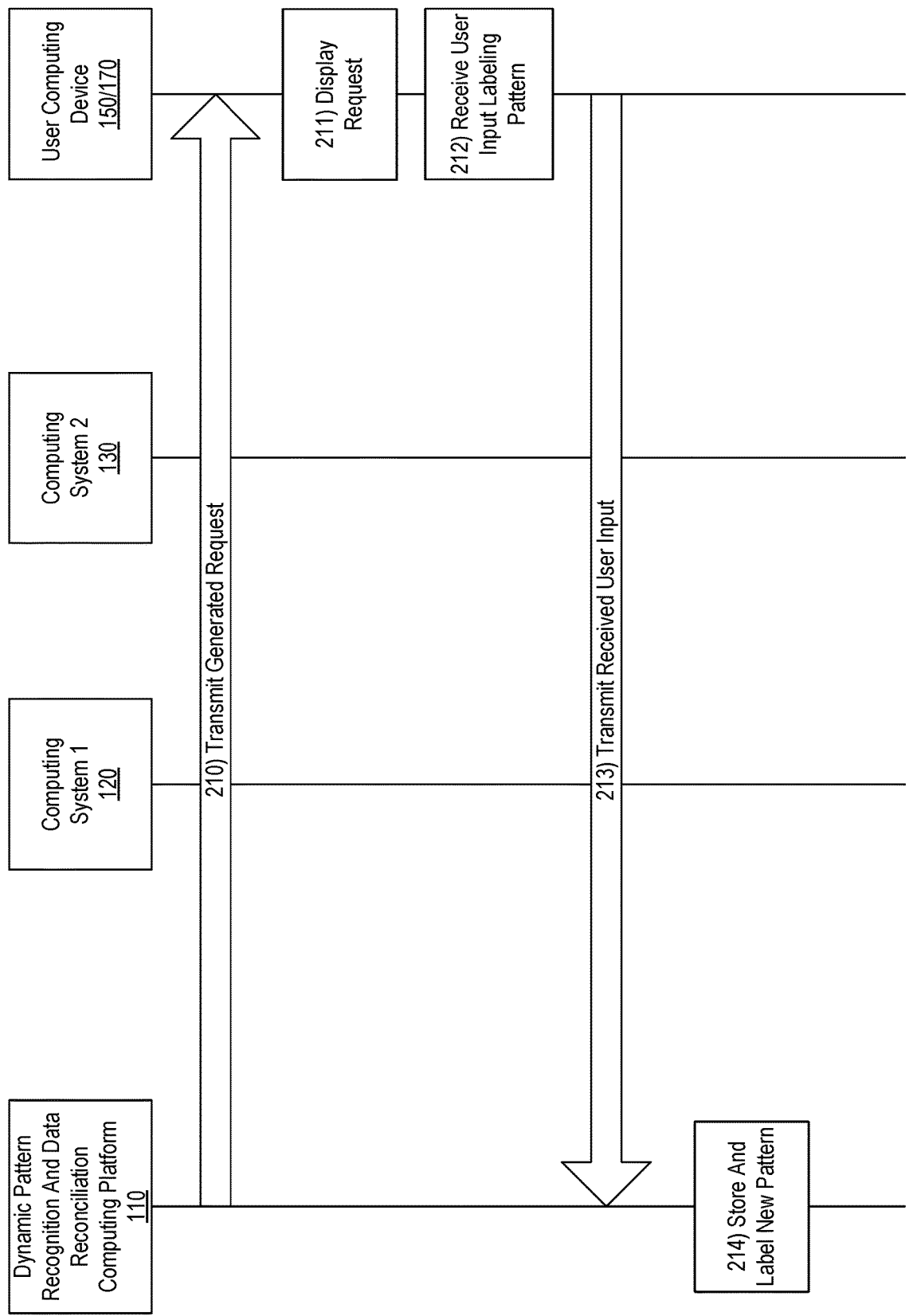

FIGS. 2A-2C depict an illustrative event sequence for implementing and using dynamic pattern recognition and data reconciliation functions in accordance with one or more aspects described herein. The events shown in the illustrative event sequence are merely one example sequence and additional events may be added, or events may be omitted, without departing from the invention.

Referring to FIG. 2A, at step 201, data may be received. In some examples, data may be received from computing system 1 120. The data may include datasets, data elements, and the like, received from one or more applications and that may require evaluation and/or data controls. In step 202, data may be received from computing system 2 130. In some examples, data may be received from additional computing systems or devices, or may be received from one of computing system 1 120 and/or computing system 2 130.

In step 203, the data may be received by the dynamic pattern recognition and data reconciliation computing platform 110. For instance, the data may be received by the pattern identification and matching engine 112a and may be evaluated.

In step 204, pattern recognition and data reconciliation functions may be initiated and/or activated. For instance, receipt of data from one or more computing systems (e.g., computing system 1 120, computing system 2 130, or the like) may cause functions of the dynamic pattern recognition and data reconciliation computing platform 110 to initiate or activate. For instance, functions that may have been disabled may be enabled upon receipt of the data.

In step 205, one or more datasets for evaluation may be extracted. With reference to FIG. 2B, in step 206, the extracted one or more datasets may be compared to previously stored data patterns to determine whether the datasets match one or more pre-stored patterns. In step 207, a determination may be made that the extracted one or more datasets do not match one or more pre-stored patterns.

In step 208, a dataset not matching one or more pre-stored patterns may be flagged as a new (e.g., not matching a pre-stored pattern) pattern. In step 209, a user interface may be generated. The user interface may include an indication that a new pattern has been identified, a request for user instructions regarding storing the new pattern, a request for user instructions regarding labeling the new pattern, and the like.

With reference to FIG. 2C, in step 210, the generated user interface including the request for user input may be transmitted to a computing device, such as local user computing device 150, local user computing device 155, remote user computing device 170, remote user computing device 175, or the like. In step 211, the user interface including the request for user input may be displayed on a display of the computing device. In some examples, the user interface may include a command generated by the dynamic pattern recognition and data reconciliation computing platform 110 that may cause the user interface to display on the display of the computing device 150, 170.

In step 212, user input may be received. In some examples, the user input may include instructions to store or not store the newly identified pattern, a label or identifier to associate with the pattern, and the like.

In step 213, the received user input may be transmitted to the dynamic pattern recognition and data reconciliation computing platform 110 and, in step 214, the instructions associated with the user input may be executed. For instance, the newly identified pattern may be labeled and stored (e.g., with the associated label).

Figure 3A:
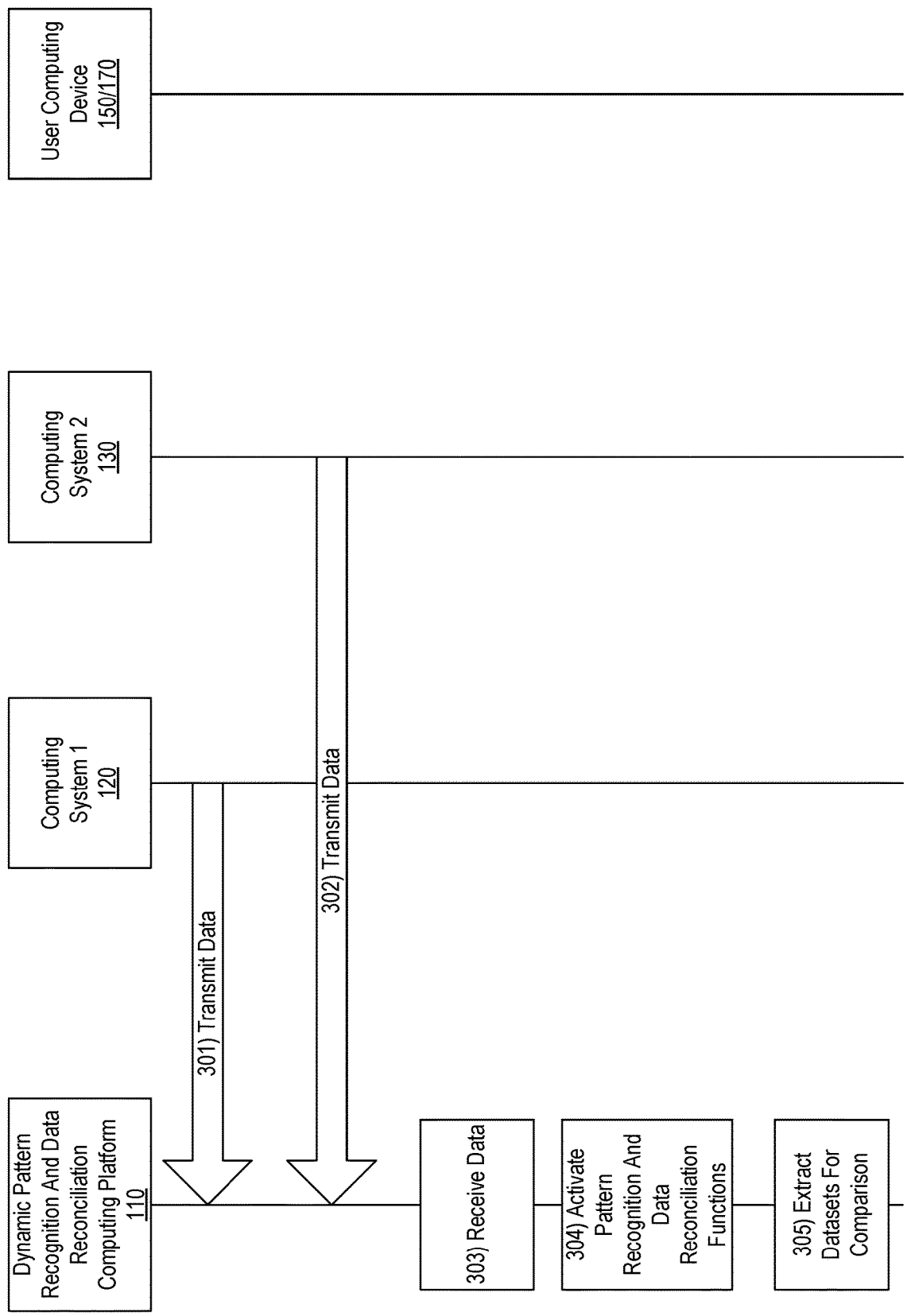
FIG. 3A-3D depict another illustrative event sequence for implementing dynamic pattern recognition and data reconciliation functions in accordance with one or more aspects described herein.
Figure 3B:
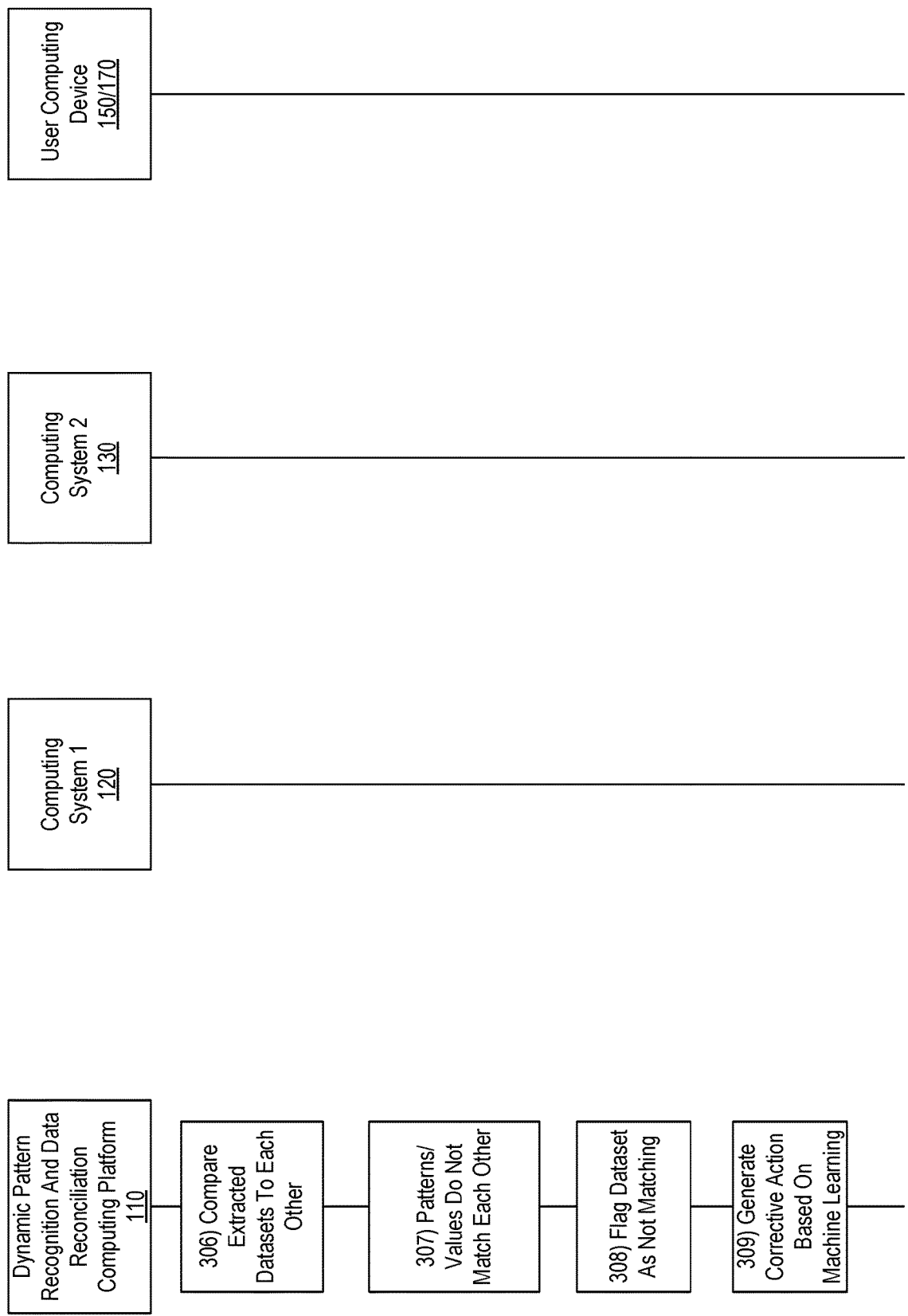
Figure 3C:
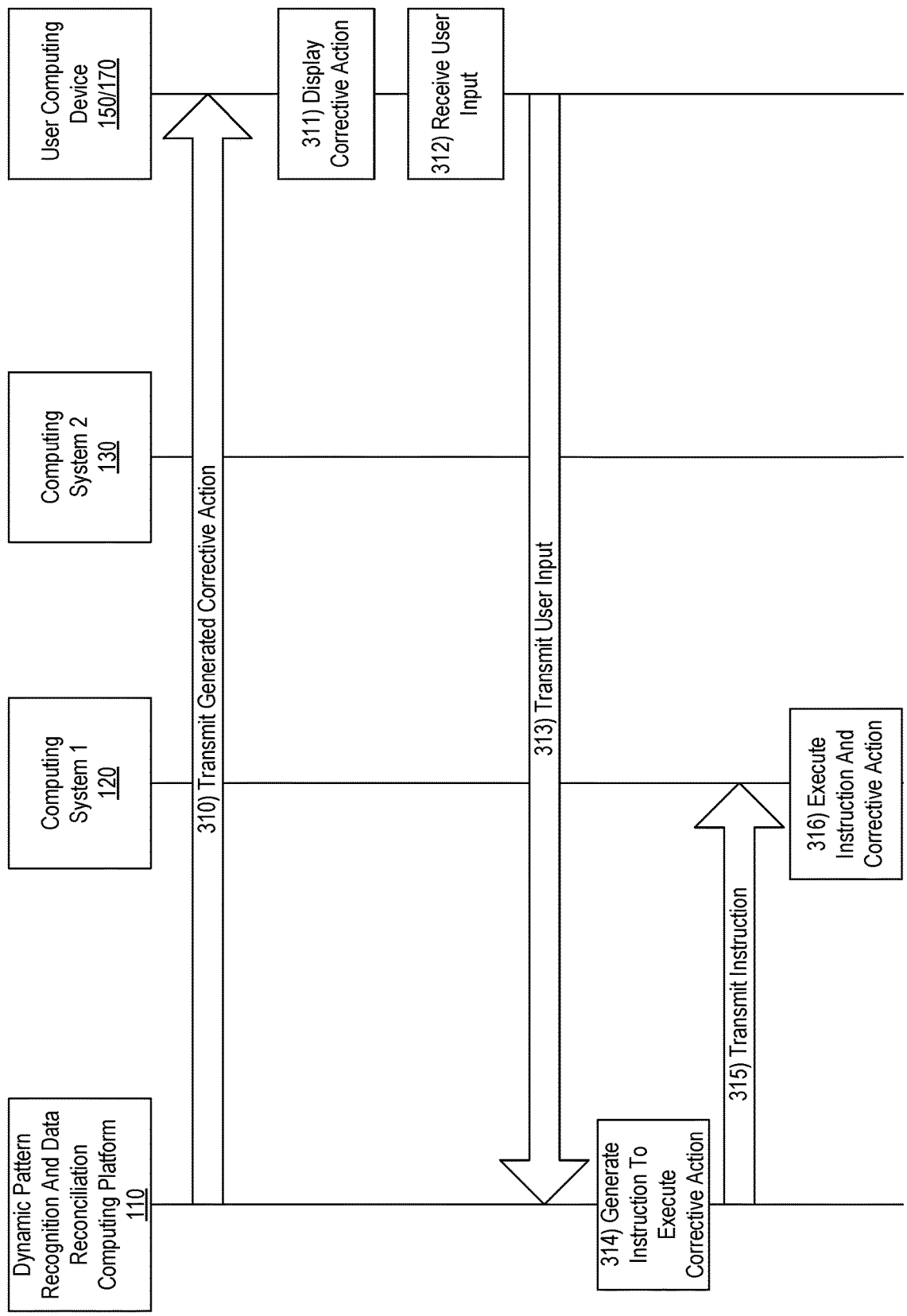

FIGS. 3A-3C depict another illustrative event sequence for implementing and using dynamic pattern recognition and data reconciliation functions in accordance with one or more aspects described herein. The events shown in the illustrative event sequence are merely one example sequence and additional events may be added, or events may be omitted, without departing from the invention.

Referring to FIG. 3A, at step 201, data may be received. In some examples, data may be received from computing system 1 120. The data may include datasets, data elements, and the like, received from one or more applications and that may require evaluation and/or data controls. In step 302, data may be received from computing system 2 130. In some examples, data may be received from additional computing systems or devices, or may be received from one of computing system 1 120 and/or computing system 2 130.

In step 303, the data may be received by the dynamic pattern recognition and data reconciliation computing platform 110. For instance, the data may be received by the pattern identification and matching engine 112*a* and may be evaluated.

In step 304, pattern recognition and data reconciliation functions may be initiated and/or activated. For instance, receipt of data from one or more computing systems (e.g., computing system 1 120, computing system 2 130, or the like) may cause functions of the dynamic pattern recognition and data reconciliation computing platform 110 to initiate or activate. For instance, functions that may have been disabled may be enabled upon receipt of the data.

In step 305, one or more datasets for comparison may be extracted. In some examples, one or more machine learning datasets (e.g., a first plurality of machine learning datasets) may be used to identify one or more datasets, data elements, or the like, for comparison. For instance, in some arrangements, probabilistic clustering may be used to recognize attributes of different datasets, data elements, or the like, and identify those datasets, data elements, or the like, for comparison.

With reference to FIG. 3B, in step 306, the extracted or identified datasets, data elements, or the like may be compared to each other to determine whether a pattern and/or value of each dataset, data element, or the like, matches a pattern and/or value of another dataset, data element, or the like. In step 307, a determination may be made that the patterns and/or values do not match. In step 308, the dataset, data element, or the like, having the non-matching pattern and/or value may be flagged as non-matching.

In step 309, one or more machine learning datasets (e.g., a second plurality of machine learning datasets which may be the same as the first plurality of machine learning datasets or different from the first plurality of machine learning datasets) may be used to predict or generate a corrective action. In some examples, the corrective action may modify or transform data associated with a non-matching pattern and/or value to revise the pattern and/or value to match an expected pattern and/or value or a pattern and/or value of another dataset, data element, or the like.

With reference to FIG. 3C, in step 310, the predicted or generated corrective action may be transmitted to a computing device, such as local user computing device 150, remote user computing device 170, or the like. In some examples, the predicted or generated corrective action may be transmitted in a user interface displaying the corrective action and requesting user input regarding executing the corrective action.

In step 311, the generated corrective action (and/or user interface) may be displayed on the computing device 150, 170. For instance, in some examples, the generated corrective action may be displayed alongside the data being analyzed. The generated corrective action may include a radio button, check box, or the like, that, when selected, may cause execution of the generated corrective action. Selection of the option to execute the corrective action may cause a reward or other validation mechanism to be transmitted to the system to validate the one or more machine learning datasets, as will be discussed more fully herein.

In step 312, user input may be received via the computing device 150, 170. In some examples, the user interface may include instructions regarding executing the corrective action, not executing the corrective action, modifying the corrective action, and the like. The received user input may be transmitted to the dynamic pattern recognition and data reconciliation computing platform 110 in step 313.

In step 314, the user input may be received and, based on the user input, an instruction to execute the corrective action may be received. In some examples, the instruction to execute the corrective action may be automatically generated and/or may be automatically executed without user input, as will be discussed more fully below.

Figure 3D:
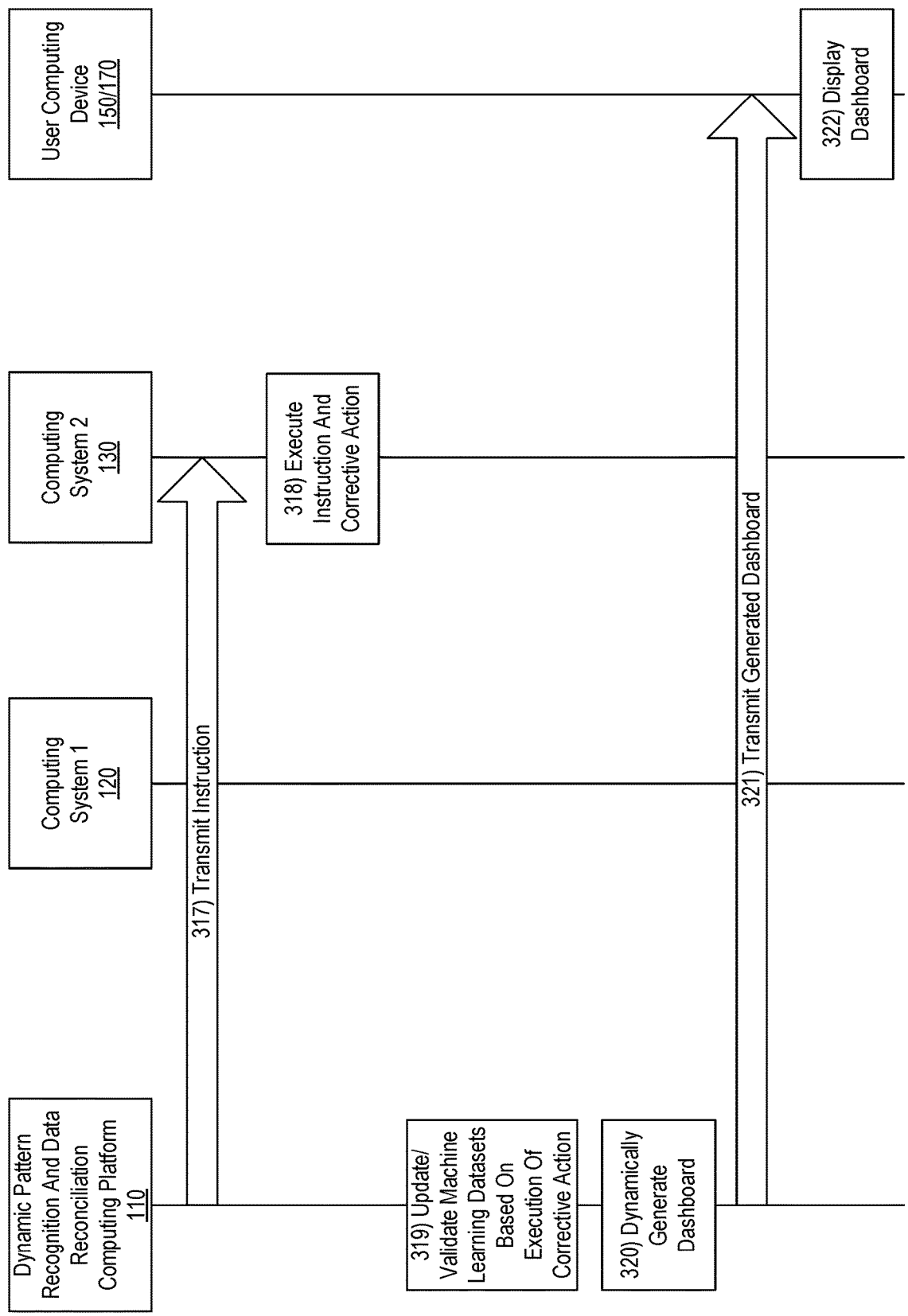

The instruction to execute the corrective action may be transmitted to a computing device. For instance, if the data having a non-matching pattern and/or value was received from computing system 1 120, in step 315, the instruction to execute the corrective action may be transmitted to computing system 1 120 and, in step 316, may be executed by computing system 1 120. In another example, and with reference to FIG. 3D, if the data having a non-matching pattern and/or value was received from computing system 2 130, the instruction to execute the corrective action may be transmitted to computing system 2 130 in step 317. In step 318, the instruction may be executed by computing system 2 120. In some examples, executing the instruction including the corrective action may include modifying the data, data structure, or the like, associated with the data. Additionally or alternatively, although the example above includes transmitting the instruction to execute the corrective action to a particular computing system based on a source of the data, the instruction may be transmitted to multiple computing systems, all computing systems, or the like, without departing from the invention.

In step 319, the one or more machine learning datasets may be updated and/or validated based on execution of the corrective action. For instance, in arrangements in which user input is requested regarding executing a corrective action, if the user input indicates that the generated corrective action should be executed, this will validate the generated recommendation based on the machine learning datasets (e.g., reinforced learning). In other examples, if user input rejects the generated corrective action, the one or more machine learning datasets may be updated to reflect that the corrective action was not executed. Accordingly, the machine learning datasets may be continuously updated and/or validated to ensure accurate pattern matching, appropriate prediction of corrective actions, and the like.

In step 320, a dashboard may be dynamically generated. In some examples, the dashboard may include a user interface having dynamic fields that are generated and displayed based on type of data, type of pattern, strength of match, lack of match, corrective action generated, and the like. In step 321, the dashboard may be transmitted to a computing device, such as user computing device 150, 170 and, in step 322, the dashboard may be displayed on the computing device 150, 170.

Figure 4:
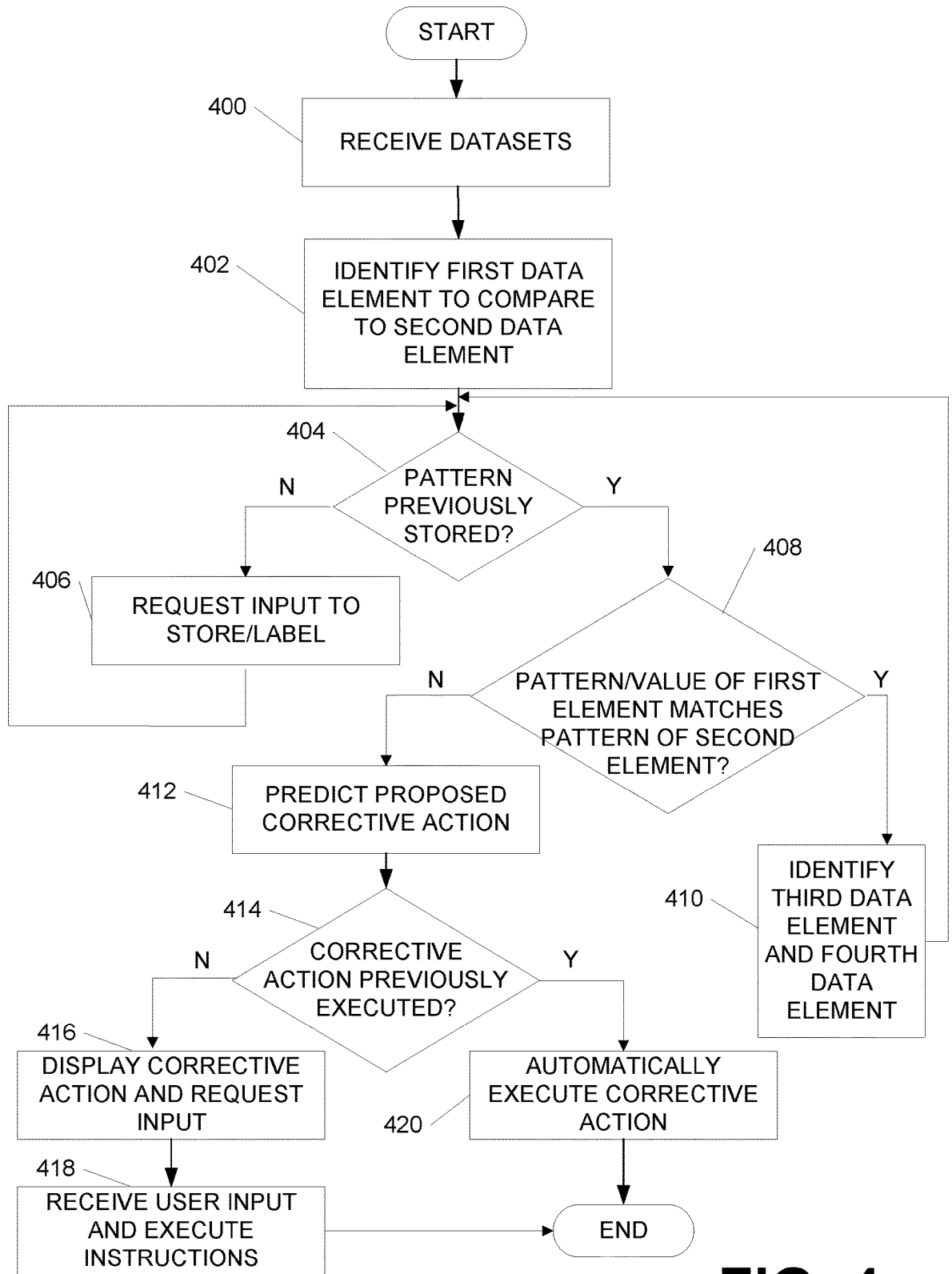
FIG. 4 depicts an illustrative method for implementing and using a system to perform dynamic pattern recognition and data reconciliation functions, according to one or more aspects described herein.

FIG. 4 is a flow chart illustrating one example method of implementing a system for dynamic pattern recognition and data reconciliation. The processes illustrated in FIG. 4 are merely some example processes and functions. The steps shown may be performed in a different order, more steps may be added, or one or more steps may be omitted without departing from the invention.

In step 400, one or more datasets may be received. In some examples, a plurality of datasets may be received. The datasets may include various types of data having various formats, and the like.

In step 402, a first data element of the first dataset and a second data element of the second dataset for comparison may be identified. In some examples, one or more machine learning datasets may be used to determine the first data element and the second data element. For example, various machine learning algorithms may be used to determine or identify a first data element and a second data element. In some examples, the machine learning algorithms may include one or more clustering type machine learning algorithms.

In step 404, a determination may be made as to whether a pattern of at least one of the first data element and the second data element has been previously stored. If not, the system may recognize the pattern as a new pattern and may request user input regarding next steps associated with the newly identified pattern in step 406. For instance, the system may generate a user interface or prompt identifying the pattern as not matching a previously stored pattern and requesting user input as to whether the newly recognized pattern should be stored. If a user requests to store the newly recognized pattern, in some examples, the system may prompt the user to identify a name, label, or other identifier to be associated with the newly recognized pattern. The process may then return to step 404.

If, in step 404, the pattern has been previously stored, the system may determine whether a pattern and/or value of the first data element matches a pattern and/or value of the second data element in step 408. If the pattern and/or value of the first data element matches the pattern and/or value of the second data element, the system may proceed to identify additional data elements (e.g., a third data element to compare to a fourth data element) for comparison in step 410.

If, in step 408, the pattern and/or value of the first data element does not match the pattern and/or value of the second data element, in step 412, one or more machine learning datasets may be used to generate or predict a proposed corrective action. In some examples, the proposed corrective action may include modifying at least one of the first data element and the second data element to match the pattern and/or value of the first data element and the pattern and/or value of the second data element.

In step 414, a determination may be made as to whether the generated corrective action was previously executed. For instance, the system may determine whether the proposed corrective action was previously executed in a previously occurring similar context. If so, the corrective action may be automatically executed (e.g., an instruction generated, transmitted to a computing system and executed without user input) in step 420. In some examples, determining whether the generated corrective action was previously executed may include determining whether the proposed corrective action was executed at least a threshold number of times (e.g., a threshold number greater than 1). If not, the system may determine that the proposed corrective action was not previously executed and may proceed to step 416. If so, the corrective action may be automatically executed in step 420.

Additionally or alternatively, determining whether the proposed corrective action was previously executed may include determining whether the proposed corrective action was executed in the most recent previous occurrence of the corrective action being proposed. For instance, the system may determine whether the immediately preceding occurrence of the proposed corrective action was executed and, if so, may determine that the corrective action was executed and may execute the corrective action in step 420. If the immediately preceding occurrence of the proposed corrective action was not executed, the system may determine that the corrective action was not executed and may proceed to step 416.

If, in step 414, the generated corrective action was not previously executed, an interface including the proposed corrective action and requesting user input may be generated and transmitted to a computing device for display in step 416. In step 418, user input may be received providing instructions regarding execution of the corrective action and the instructions may be executed.

Figure 5:
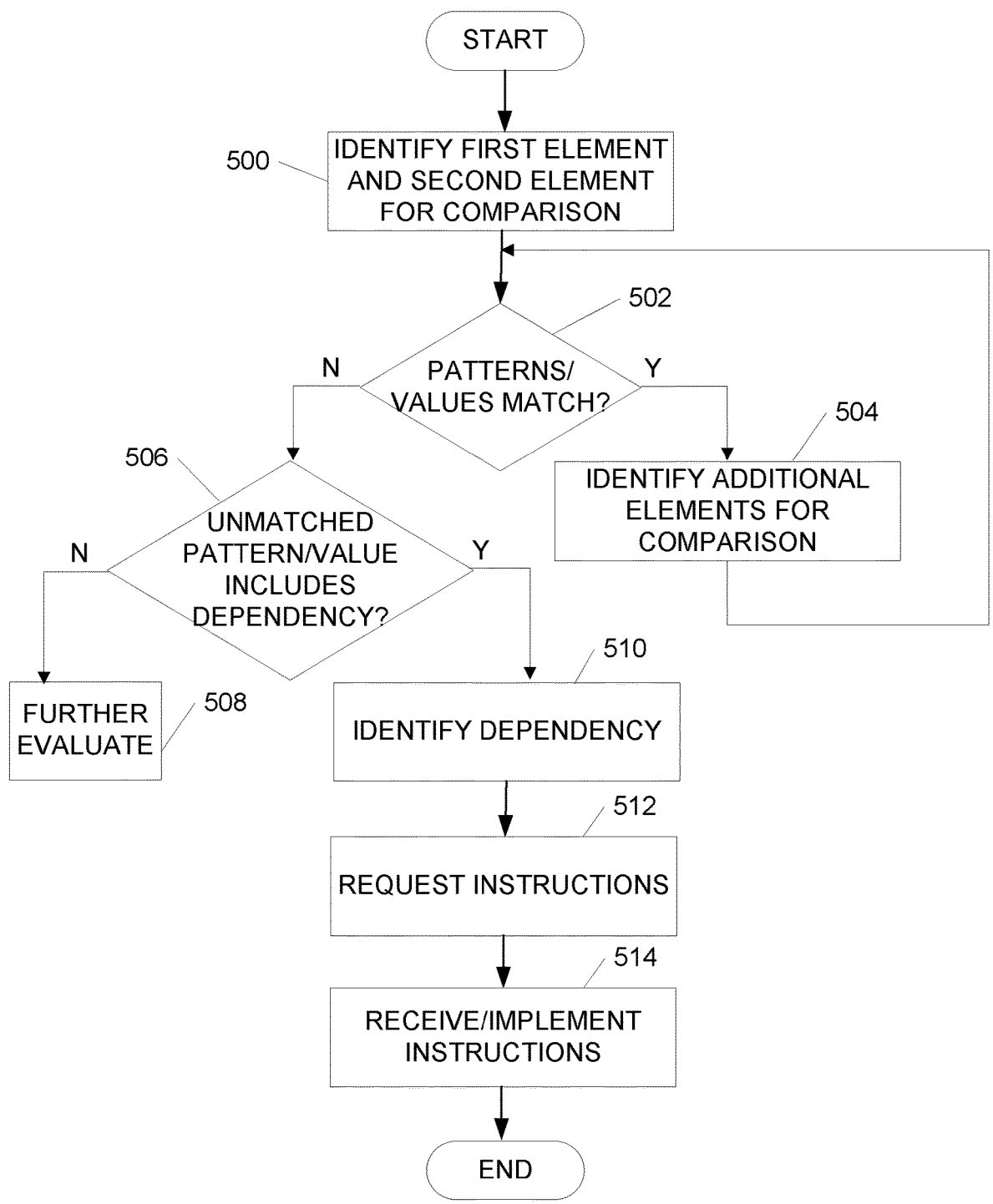
FIG. 5 depicts another illustrative method for implementing and using a system to perform dynamic pattern recognition and data reconciliation functions, according to one or more aspects described herein.

FIG. 5 is a flow chart illustrating another example method of implementing a system for dynamic pattern recognition and data reconciliation. The processes illustrated in FIG. 5 are merely some example processes and functions. The steps shown may be performed in a different order, more steps may be added, or one or more steps may be omitted without departing from the invention.

In step 500, first and second data elements or the like may be identified for comparison. For instance, as discussed above, one or more machine learning datasets may be used to identify datasets, data elements, or the like, for comparison.

In step 502, a determination may be made as to whether a pattern and/or value of each data element matches the other data element. If so, additional elements may be identified for comparison in step 504.

If, in step 502, the pattern and/or value of each data element does not match the other data element, a determination may be made in step 506 as to whether the non-matching pattern and/or value includes a dependency. For instance, the system may determine whether a portion of a pattern matches, whether a portion of a value in the data elements matches, or the like. If not, the data elements may be flagged for further evaluation (e.g., predictive corrective action, or the like, as discussed herein).

If, in step 506, the unmatched pattern/value does include a dependency (e.g., a portion of the pattern matches, a portion of the value matches, or the like) the dependency may be identified as a dependency in step 510. For instance, if the first data element includes "0000ABCD" and the second data element includes "ABCD," a dependency might be identified because a portion of the value in the first data element matches a portion of the value of the second data element. In step 512, instructions regarding the dependency may be requested. For instance, a user interface may be generated and transmitted for display on a computing device. The user interface may include a request for instructions regarding mapping the dependency, defining the format of the dependency, and the like. In step 514, user input including instructions regarding the dependency may be received and executed.

The systems and arrangements described herein enable use of machine learning to standardize data, perform pattern recognition and data reconciliation functions. Accordingly, vast amounts of data may be evaluated for accuracy, and the like, without requiring a large outlay of computing resources, user or administrator time, and the like. In addition, aspects of the arrangements described herein rely on reinforcement learning. Accordingly, the machine learning datasets may be updated and/or validated in an ongoing manner to ensure that the pattern recognition and data reconciliation functions are performed based on recent data, accurate data, and the like.

Figure 6:
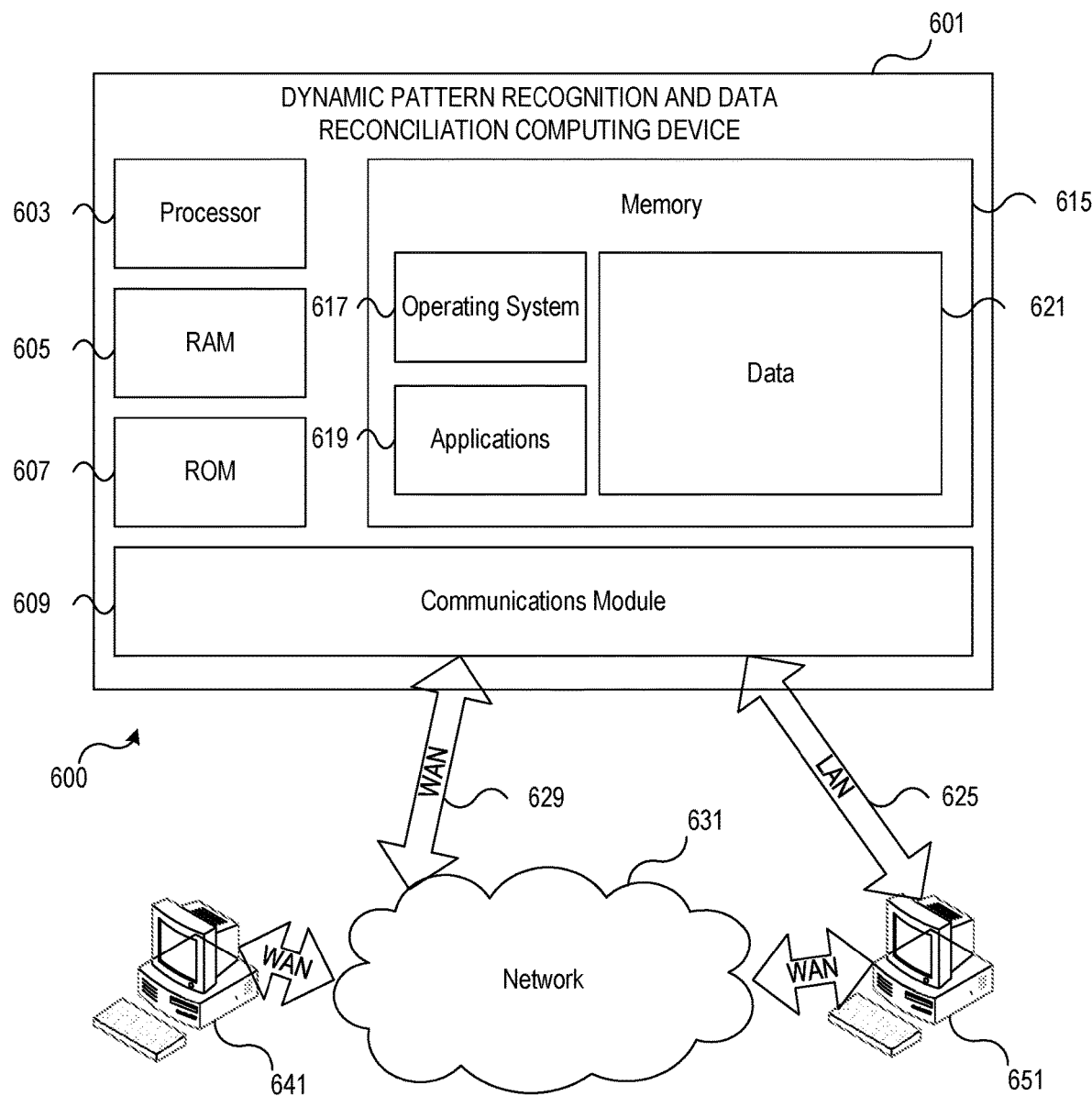
FIG. 6 illustrates one example operating environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include dynamic pattern recognition and data reconciliation computing device 601 having processor 603 for controlling overall operation of dynamic pattern recognition and data reconciliation computing device 601 and its associated components, including Random Access Memory (RAM) 605, Read-Only Memory (ROM) 607, communications module 609, and memory 615. Dynamic pattern recognition and data reconciliation computing device 601 may include a variety of computer readable media. Computer readable media may be any available media that may be accessed by dynamic pattern recognition and data reconciliation computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic pattern recognition and data reconciliation computing device 601. Such a processor may execute computer-executable instructions stored on a computer-readable medium.

Software may be stored within memory 615 and/or storage to provide instructions to processor 603 for enabling dynamic pattern recognition and data reconciliation computing device 601 to perform various functions. For example, memory 615 may store software used by dynamic pattern recognition and data reconciliation computing device 601, such as operating system 617, application programs 619, and associated database 621. Also, some or all of the computer executable instructions for dynamic pattern recognition and data reconciliation computing device 601 may be embodied in hardware or firmware. Although not shown, RAM 605 may include one or more applications representing the application data stored in RAM 605 while dynamic pattern recognition and data reconciliation computing device 601 is on and corresponding software applications (e.g., software tasks) are running on dynamic pattern recognition and data reconciliation computing device 601.

Communications module 609 may include a microphone, keypad, touch screen, and/or stylus through which a user of dynamic pattern recognition and data reconciliation computing device 601 may provide input, and may also include one or more of a speaker for providing audio output and a video display device for providing textual, audiovisual and/or graphical output. Computing system environment 600 may also include optical scanners (not shown). Exemplary usages include scanning and converting paper documents, e.g., correspondence, receipts, and the like, to digital files.

Dynamic pattern recognition and data reconciliation computing device 601 may operate in a networked environment supporting connections to one or more remote computing devices, such as computing devices 641 and 651. Computing devices 641 and 651 may be personal computing devices or servers that include any or all of the elements described above relative to dynamic pattern recognition and data reconciliation computing device 601.

The network connections depicted in FIG. 6 may include Local Area Network (LAN) 625 and Wide Area Network (WAN) 629, as well as other networks. When used in a LAN networking environment, dynamic pattern recognition and data reconciliation computing device 601 may be connected to LAN 625 through a network interface or adapter in communications module 609. When used in a WAN networking environment, dynamic pattern recognition and data reconciliation computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 7:
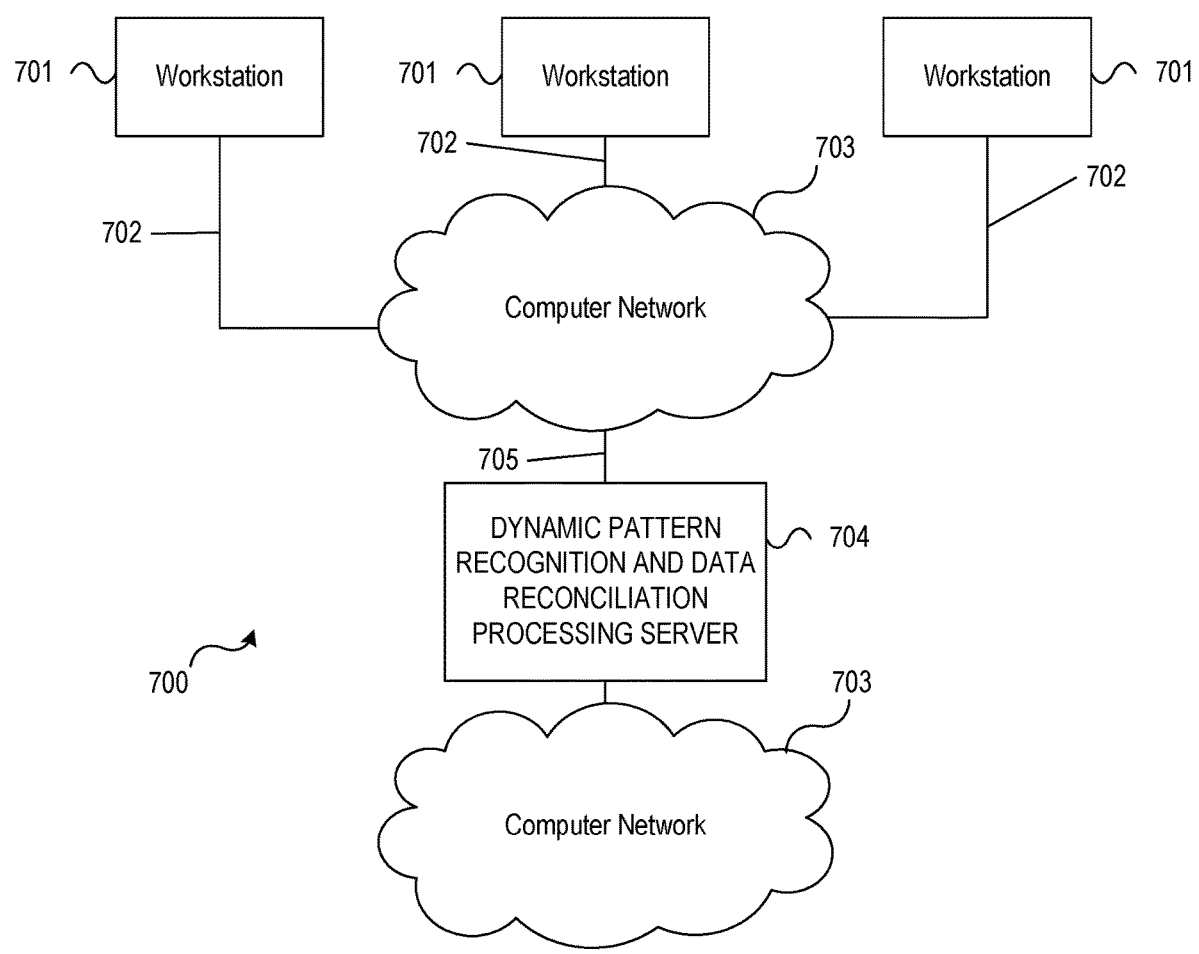
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to dynamic pattern recognition and data reconciliation processing server 704. In system 700, dynamic pattern recognition and data reconciliation processing server 704 may be a server, processor, computer, or data processing device, or combination of the same, configured to perform the functions and/or processes described herein. Server 704 may be used to receive data, extract datasets, compare datasets or data elements, determine whether a match exists, generate a proposed corrective action, generate a dynamic dashboard, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and dynamic pattern recognition and data reconciliation processing server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A dynamic pattern recognition and data reconciliation computing platform, comprising:
at least one processor;
a communication interface communicatively coupled to the at least one processor; and
memory storing computer-readable instructions that, when executed by the at least one processor, cause the dynamic pattern recognition and data reconciliation computing platform to:
receive, from one or more applications executing on one or more computing devices, a plurality of data sets including at least a first data set received from one or more applications executing on a first computing device of the one or more computing devices, and a second data set received from one or more applications executing on a second computing device of the one or more computing devices;
compare the at least a first data set to the at least a second data set, comparing including:
using a first plurality of machine learning datasets to identify a first data element of the first data set to be compared to a second data element of the second data set, identifying the first data element and the second data element includes using probabilistic clustering to recognize attributes of the first data element and the second data element;
determine whether at least one of: a pattern of the first data element and a value of the first data element matches at least one of: a pattern of the second data element and a value of the second data element;
responsive to determining that the at least one of: the pattern of the first data element and the value of the first data element matches the at least one of: the pattern of the second data element and the value of the second data element, using the first plurality of machine learning datasets to identify a third data element to compare to a fourth data element;
responsive to determining that the at least one of: the pattern of the first data element and the value of the first data element does not match the at least one of: the pattern of the second data element and the value of the second data element, predict, based on a second plurality of machine learning datasets, a proposed corrective action to modify at least one of: the first data element and the second data element, the proposed corrective action being generated based on other data elements within one of the first data set and the second data set;
determine whether previous occurrences of the proposed corrective action were executed at least a threshold number of times;
responsive to determining that the previous occurrences of the proposed corrective action were executed at least a threshold number of times, automatically transmit an instruction to execute the proposed corrective action; and
responsive to determining that the previous occurrences of the proposed corrective action were not executed at least a threshold number of times, request user input prior to executing the proposed corrective action;
transmit the instruction to execute the proposed corrective action; and
generate a user interface including categories dynamically selected based on one of: strength of match between the pattern of the first data element and the value of the first data element and the at least one of: the pattern of the second data element and the value of the second data element, or a difference in pattern if the match between the pattern of the first data element and the value of the first data element with the at least one of the pattern of the second data element and the value of the second data element did not occur.

2. The dynamic pattern recognition and data reconciliation computing platform of claim 1, further including instructions that, when executed, cause the dynamic pattern recognition and data reconciliation computing platform to:
determine whether the pattern of the first data element matches a previously stored pattern; and
responsive to determining that the pattern of the first data element does not match the previously stored pattern, identifying the pattern of the first data element as a new pattern.

3. The dynamic pattern recognition and data reconciliation computing platform of claim 2, further including instructions that, when executed, cause the dynamic pattern recognition and data reconciliation computing platform to:
generate a user interface requesting instructions to store and label the new pattern; and
transmit the user interface to a computing device for display on the computing device.

4. The dynamic pattern recognition and data reconciliation computing platform of claim 1, wherein modifying at least one of: the first data element and the second data element further includes modifying one of the first data element and the second data element to match at least one of: the pattern or value of the other of the first data element and the second data element.

5. The dynamic pattern recognition and data reconciliation computing platform of claim 1, wherein requesting user input prior to executing the proposed corrective action includes:
generate a user interface requesting user input to execute the proposed corrective action; and
transmit the user interface requesting user input to execute the proposed corrective action to a computing device for display.

6. The dynamic pattern recognition and data reconciliation computing platform of claim 5, wherein the proposed corrective action is displayed on the generated user interface alongside the at least one of: the first data element and the second data element.

7. The dynamic pattern recognition and data reconciliation computing platform of claim 1, further including instructions that, when executed, cause the computing platform to:
determine that a portion of the first data element matches a portion of the second data element; and
identify a dependency between the first data element and the second data element.

8. A method, comprising:
at a computing platform comprising at least one processor, memory, and a communication interface:
receiving, via the communication interface and by the at least one processor and from one or more applications executing on one or more computing devices, a plurality of data sets including at least a first data set received from one or more applications executing on a first computing device of the one or more computing devices, and a second data set received from one or more applications executing on a second computing device of the one or more computing devices;
comparing, by the at least one processor, the at least a first data set to the at least a second data set, comparing including:
using, by the at least one processor, a first plurality of machine learning datasets to identify a first data element of the first data set to be compared to a second data element of the second data set, identifying the first data element and the second data element includes using probabilistic clustering to recognize attributes of the first data element and the second data element;
determining, by the at least one processor, whether at least one of: a pattern of the first data element and a value of the first data element matches at least one of: a pattern of the second data element and a value of the second data element;
responsive to determining that the at least one of: the pattern of the first data element and the value of the first data element matches the at least one of: the pattern of the second data element and the value of the second data element, using, by the at least one processor, the first plurality of machine learning datasets to identify a third data element to compare to a fourth data element;
responsive to determining that the at least one of: the pattern of the first data element and the value of the first data element does not match the at least one of: the pattern of the second data element and the value of the second data element, predicting, by the at least one processor and based on a second plurality of machine learning datasets, a proposed corrective action to modify at least one of: the first data element and the second data element, the proposed corrective action being generated based on other data elements within one of the first data set and the second data set;
determining, by the at least one processor, whether an immediately preceding occurrence of the proposed corrective action was executed;
responsive to determining that the immediately preceding occurrence of the proposed corrective action was executed, automatically transmitting an instruction to execute the proposed corrective action;
responsive to determining that the immediately preceding occurrence of the proposed corrective action was not executed, requesting user input prior to executing the proposed corrective action;
transmitting, by the at least one processor, the instruction to execute the proposed corrective action; and
generating, by the at least one processor, a user interface including categories dynamically selected based on one of: strength of match between the pattern of the first data element and the value of the first data element and the at least one of: the pattern of the second data element and the value of the second data element, or a difference in pattern if the match between the pattern of the first data element and the value of the first data element with the at least one of the pattern of the second data element and the value of the second data element did not occur.

9. The method of claim 8, further including:
determining, by the at least one processor, whether the pattern of the first data element matches a previously stored pattern; and
responsive to determining that the pattern of the first data element does not match the previously stored pattern, identifying, by the at least one processor, the pattern of the first data element as a new pattern.

10. The method of claim 9, further including:
generating, by the at least one processor, a user interface requesting instructions to store and label the new pattern; and
transmitting, by the at least one processor, the user interface to a computing device for display on the computing device.

11. The method of claim 8, wherein requesting user input prior to transmitting the instruction to execute the proposed corrective action includes:
generating, by the at least one processor, a user interface requesting user input to execute the proposed corrective action; and
transmitting, by the at least one processor, the user interface requesting user input to execute the proposed corrective action to a computing device for display.

12. One or more non-transitory computer-readable media storing instructions that, when executed by a computing platform comprising at least one processor, memory, and a communication interface, cause the computing platform to:
receive, from one or more applications executing on one or more computing devices, a plurality of data sets including at least a first data set received from one or more applications executing on a first computing device of the one or more computing devices, and a second data set received from one or more applications executing on a second computing device of the one or more computing devices;
compare the at least a first data set to the at least a second data set, comparing including:
using a first plurality of machine learning datasets to identify a first data element of the first data set to be compared to a second data element of the second data set, identifying the first data element and the second data element includes using probabilistic clustering to recognize attributes of the first data element and the second data element;
determine whether at least one of: a pattern of the first data element and a value of the first data element matches at least one of: a pattern of the second data element and a value of the second data element;
responsive to determining that the at least one of: the pattern of the first data element and the value of the first data element matches the at least one of: the pattern of the second data element and the value of the second data element, using the first plurality of machine learning datasets to identify a third data element to compare to a fourth data element;
responsive to determining that the at least one of: the pattern of the first data element and the value of the first data element does not match the at least one of: the pattern of the second data element and the value of the second data element, predict, based on a second plurality of machine learning datasets, a proposed corrective action to modify at least one of: the first data element and the second data element, the proposed corrective action being generated based on other data elements within one of the first data set and the second data set;

determine whether an immediately preceding occurrence of the proposed corrective action was executed;

responsive to determining that the immediately preceding occurrence of the proposed corrective action was executed, automatically transmit an instruction to execute the proposed corrective action;

responsive to determining that the immediately preceding occurrence of the proposed corrective action was not executed, requesting user input prior to transmitting the instruction to execute the proposed corrective action;

transmit the instruction to execute the proposed corrective action; and generate a user interface including categories dynamically selected based on one of: strength of match between the pattern of the first data element and the value of the first data element and the at least one of: the pattern of the second data element and the value of the second data element, or a difference in pattern if the match between the pattern of the first data element and the value of the first data element with the at least one of the pattern of the second data element and the value of the second data element did not occur.

13. The one or more non-transitory computer-readable media of claim 12, further including instructions that, when executed, cause the computing platform to:

determine whether the pattern of the first data element matches a previously stored pattern; and responsive to determining that the pattern of the first data element does not match the previously stored pattern, identifying the pattern of the first data element as a new pattern.

14. The one or more non-transitory computer-readable media of claim 13, further including instructions that, when executed, cause the computing platform to:

generate a user interface requesting instructions to store and label the new pattern; and transmit the user interface to a computing device for display on the computing device.

15. The one or more non-transitory computer-readable media of claim 12, wherein requesting user input prior to executing the proposed corrective action includes:

generate a user interface requesting user input to execute the proposed corrective action; and transmit the user interface requesting user input to execute the proposed corrective action to a computing device for display.

* * * * *